May 22, 1928.
L. CARUSO
1,670,650
TOY CAR TRUCK CONSTRUCTION
Filed June 9, 1926
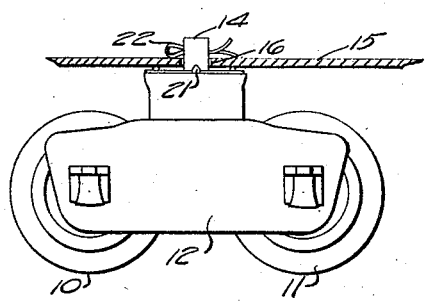
FIG. 1.
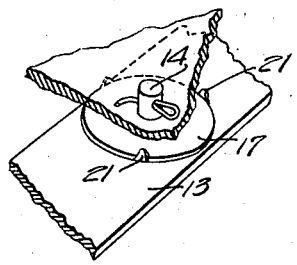
FIG. 2.
FIG. 3.
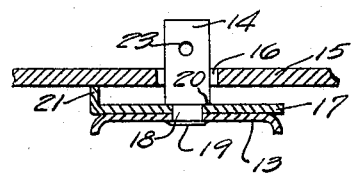
INVENTOR
LOUIS CARUSO
BY
ATTORNEY Patented May 22, 1928.

1,670,650

UNITED STATES PATENT OFFICE.

LOUIS CARUSO, OF IRVINGTON, NEW JERSEY, ASSIGNOR TO THE LIONEL CORPORATION, OF NEW YORK, N. Y., A CORPORATION OF NEW YORK.

TOY CAR-TRUCK CONSTRUCTION.

Application filed June 9, 1926. Serial No. 114,635.

The present invention relates to improvements in toy car truck construction and is more particularly directed toward improving the construction of toy electric railroad car trucks by providing an improved ground connection between the car body and the running gear of the car.

Toy electric railroads utilize cars constructed of sheet metal to simulate the standard railroad car, and these cars may be furnished with electric lamps to illuminate the interior of the car. The current supply for these lamps is taken off a third rail by a moving contact carried by the car truck and insulated from it. An example of such a contact is shown in my application Serial No. 32,091, filed May 22, 1925. These systems use the track rails for a return connection. The car and truck are made of metal and the lamp socket is grounded to the car body. Poor contact between the car body and truck may cause the lamp to burn intermittently or dimly.

As these parts are lacquered or painted, it is necessary to remove the lacquer or paint from the contacting parts to insure a good electrical connection. The present invention contemplates the provision of a device in the construction of the car which will insure the removal of the paint and the making of a good contact at all times.

An object of the present invention is to provide a washer or disk carried between the car truck and car body and provided with projections which engage the lower surface of the car body to scratch off the paint or lacquer, and to so arrange these parts that good electrical contact will be maintained between the car body and the truck.

The accompanying drawings show, for purposes of illustrating the invention, one of the many possible embodiments in which it may take form, it being understood that the drawings are illustrative of the invention rather than limiting the same.

In these drawings:

Figure 1 is a side elevational view of a car truck and a sectional view of the floor of the car body;

Figure 2 is a fragmentary perspective view of the car body floor and the upper part of the car truck; and Figure 3 is an enlarged sectional view taken in the same direction as the view of Figure 1.

The car truck is provided with the usual wheels 10 and 11 adapted to ride on the track rails of the toy railway layout. These wheels are mounted in the ordinary manner in a sheet metal frame 12 having a bridging member 13 interconnecting the sides of the car truck. The insulated contact is supported beneath the bridging member.

The bridging member carries a vertical post 14 which is preferably fixedly mounted to it. The floor 15 of the car body has an aperture 16 through which this post is passed. As these car bodies are generally painted, lacquered or enameled, and in order to insure that this surface coating is removed from a portion of the lower side of the car body, the present invention contemplates the provision of a sheet metal disk 17 which is preferably firmly held on the upper side of the bridging member of the car truck. As here shown the post 14 has a reduced lower end portion 18 which passes through the washer 17 and bridging member of the car truck. It is riveted in place as indicated at 19, and a shoulder 20 holds the washer 17 in place. This washer is provided with a number of upwardly bent prongs or teeth 21 on which the car body 15 rests. These projections will serve to scratch the lacquer, paint, or enamel off the lower side of the car body as the truck swings in the post as an axis, and will insure a good electrical contact between the car body and the car truck. In order to hold the car body in position, a cotter pin 22 is passed through a hole 23 in the pin 14.

It is obvious that the invention may be embodied in many forms and constructions, and I wish it to be understood that the particular form shown is but one of the many forms. Various modifications and changes being possible, I do not limit myself in any way with respect thereto.

I claim:

1. In a toy car, in combination, a car truck a car body, pivotal mountings interconnecting the truck and body, and a member carried above the truck and having projections engageable with the lower surface of the car body to insure good electrical contact with the car body.

2. In a toy car, in combination, a metallic car truck having a vertical metal pin, a car body having a hole in the bottom thereof through which the pin passes, and a metal washer having upstruck projections engageable with the lower surface of the car body to scratch off paint or lacquer and insure good electrical contact with the car body.

3. In a toy car, in combination, a metallic car truck having a vertical metal pin, a car body having a hole in the bottom thereof through which the pin passes, a metal washer having upstruck projections engageable with the lower surface of the car body to scratch off paint or lacquer and insure good electrical contact with the car body, and means to securely fasten the washer to the car truck.

4. In a toy car, in combination, a metallic car truck having a vertical metal pin, a car body having a hole in the bottom thereof through which the pin passes, a cotter pin passed through the pin above the floor of the car, and a metal washer having upstruck projections engageable with the lower surface of the car body to scratch off paint or lacquer and insure good electrical contact with the car body.

5. In toy car construction, the combination with a car truck swiveled relative to a car body, of a sheet metal disk having upstruck sharp prongs which engage with the lower surface of the car body to scratch off paint or lacquer and insure good electrical contact between the parts.

Signed at Irvington, in the county of Essex, and State of New Jersey, this 7th day of June, 1926.

LOUIS CARUSO.